(12) United States Patent
Shimbo et al.

(10) Patent No.: US 8,593,628 B2
(45) Date of Patent: Nov. 26, 2013

(54) SPECTRAL CHARACTERISTICS ESTIMATION DEVICE, IMAGE FORMING APPARATUS HAVING THE SAME, AND SPECTRAL CHARACTERISTICS ESTIMATION METHOD

(75) Inventors: Kohei Shimbo, Kanagawa (JP); Naohiro Kamijo, Kanagawa (JP); Manabu Seo, Kanagawa (JP); Yoichi Kubota, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 106 days.

(21) Appl. No.: 13/165,205

(22) Filed: Jun. 21, 2011

(65) Prior Publication Data
US 2011/0317149 A1   Dec. 29, 2011

(30) Foreign Application Priority Data

Jun. 29, 2010   (JP) ................. 2010-147647

(51) Int. Cl.
*G01J 3/00*   (2006.01)
*G01R 13/00*   (2006.01)

(52) U.S. Cl.
USPC ........................... 356/300; 702/66

(58) Field of Classification Search
USPC .............. 356/300, 326, 328; 702/66
See application file for complete search history.

(56) References Cited

U.S. PATENT DOCUMENTS

| 5,710,876 A * | 1/1998 | Peercy et al. ............... 345/426 |
| 7,457,000 B2 * | 11/2008 | Uchino ........................ 358/1.9 |
| 2012/0029880 A1 * | 2/2012 | Aharon et al. ............... 702/189 |

FOREIGN PATENT DOCUMENTS

| JP | 2007-208708 A | 8/2007 |
| JP | 2009-81986 A | 4/2009 |

OTHER PUBLICATIONS

Stephen K. Park et al., "Estimation of spectral reflectance curves from multispectral image data", Applied Optics, Dec. 1, 1977, p. 3107, vol. 16, No. 12.
Michalsky J. J., et al., "Estimation of Continuous Solar Spectral Distributions From Discrete Filter Measurements", Solar Energy, Jan. 1, 1984, pp. 57-64, vol. 33, No. 1.
Vrhel M. J. et al., Color Correction Using Principal Components, COLOR Research and Application, Oct. 1, 1992, pp. 328-338, vol. 17, No. 5.
Norimichi Tsumura et al., Estimation of Spectral Reflectances from Multi-Band Images by Multiple Regression Analysis, Optical Society of Japan, Kogaku, Japanese Journal of Optics, 1998, pp. 384-391, vol. 27, No. 7.

* cited by examiner

*Primary Examiner* — Gregory J Toatley
*Assistant Examiner* — Shawn Decenzo
(74) *Attorney, Agent, or Firm* — Dickstein Shapiro LLP (57) ABSTRACT

Spectral characteristics of an object is estimated using an extended sensor response, which includes a product of at least two light intensity signals whose wavelength ranges are partially overlapped with each other.

12 Claims, 3 Drawing Sheets

| EQUATION 1 | $R = [r_1, r_2, \cdots, r_n]$ |
| --- | --- |
| EQUATION 2 | $V'' = [v_1'', v_2'', \cdots, v_n'']$ |
| EQUATION 3 | $G'' = RV''^t (V'' V''^t)^{-1}$ |
| EQUATION 4 | $v'' = [s_1, s_2, \cdots, s_m, s_1 \times s_2, s_2 \times s_3, \cdots, s_{m-1} \times s_m]$ |
| EQUATION 5 | $v''' = [s_1, s_2, \cdots, s_m, \sqrt{(s_1 \times s_2)}, \sqrt{(s_2 \times s_3)}, \cdots, \sqrt{(s_{m-1} \times s_m)}]$ |

FIG. 6

```
START
  ↓
OBTAIN LIGHT INTENSITY SIGNALS                              — S1
  ↓
EXTRACT LIGHT INTENSITY SIGNALS
WHOSE WAVELENGTH RANGES ARE                                 — S2
PARTIALLY OVERLAPPED.
  ↓
GENERATE EXTENDED SENSOR RESPONSE                           — S3
BASED ON EXTRACTED SIGNALS
  ↓
ESTIMATE SPECTRAL REFLECTANCE                               — S4
BASED ON EXTENDED SENSOR RESPONSE
  ↓
END
```

SPECTRAL CHARACTERISTICS ESTIMATION DEVICE, IMAGE FORMING APPARATUS HAVING THE SAME, AND SPECTRAL CHARACTERISTICS ESTIMATION METHOD

CROSS-REFERENCE TO RELATED APPLICATIONS

This patent application is based on and claims priority under 35 U.S.C. §119 to Japanese Patent Application No. 2010-147647, filed on Jun. 29, 2010, in the Japanese Patent Office, the entire disclosure of which is hereby incorporated herein by reference.

FIELD OF THE INVENTION

The present invention generally relates to a device and method of estimating spectral characteristics of a target object, and an image forming apparatus having a device of estimating spectral characteristics of a target object.

BACKGROUND

For improved color stability and reproducibility, the recent image forming apparatuses such as copiers or printers may be managed using spectrometers such as spectrophotometers, as described in Japanese Patent Application Publication No. 2007-208708. For example, the spectrometer measures the diffused lights reflected from the output image to obtain the spectral reflectance. Based on the spectral reflectance, various parameters in the color system, such as XYZ or L*a*b* color system, are obtained. The obtained parameters may be used to evaluate color tone of the image or to correct image forming conditions of the image forming apparatus. However, in case the image forming apparatus outputs images at high speeds, inline measurement using the spectrometer has been difficult as detection speeds at the spectrometer are slower than the printing speeds.

In view of the above, the spectral reflectance of a target object, such as the output image, is usually estimated by obtaining a transformation matrix that converts the light intensity signal detected at the spectrometer to the spectral reflectance, based on measurement results of a plurality of color samples whose spectral reflectance are known, for example, as described in Tsumura, et al., Estimation of Spectral Reflectances from Multi-Band Images by Multiple Regression Analysis, Optical Society of Japan, KOGAKU, Japanese Journal of Optics, Vol. 27, No. 7, 1998, pp. 384-391.

Tsumura, et al. estimates spectral reflectance from multi-band images using the multi-regression analysis. In the analysis, the pixel values of the multi-band images and the higher order terms of the pixel values are used as explanatory variable, and the spectral reflectance is used as objective variable, thus improving estimation accuracy. For example, assuming that the second order term is used, the spectral reflectance r is calculated based on the light intensity signals $s_1$ to $s_m$ measured for m wavelength bands, using the extended sensor response vector $v'=[s_1, s_2, \ldots, s_m, s_1*s_1, s_2*s_2, \ldots, s_m*s_m]$.

SUMMARY

The inventors of the present invention have realized that estimation of the spectral reflectance using the extended sensor response vector v' as proposed by Tsumura, et al. still requires a certain amount of time to complete calculation such that this estimation method may not be applicable to the case where high processing speeds are required.

For example, assuming that a number of elements in the sensor response vector v is 6, that is, m=6, the second order term is 6*6=36. Accordingly, a number of elements in the extended sensor response vector v' is 36+6=42. Thus, calculating the transformation matrix G or the spectral reflectance vector r using the extended sensor response vector v' having a large number of elements increases calculation load, thus requiring more time for calculation.

In view of the above, the inventors of the present invention have discovered that there are high order terms (second or greater order terms), which do not contribute much to estimation of spectral reflectance as they correspond to smaller components of the light intensity signals. Further, such insignificant high order terms tend to even lower the estimation accuracy as they are most likely to be affected by noise introduced at the time of signal detection. Based on this findings, the inventors of the present invention propose to generate the extended sensor response vector v" using only the high order terms from which the above-described insignificant high order terms are excluded. Using this extended sensor response vector v" having smaller number of elements, spectral reflectance can be estimated with less processing time. Further, the use of extended sensor response vector v" from which the insignificant high order teems are excluded improves the accuracy in estimating spectral reflectance.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Figure 1:
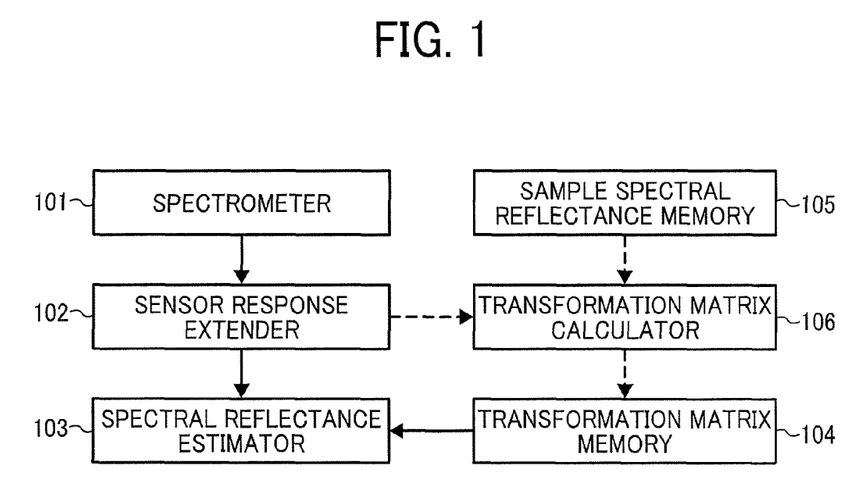
FIG. 1 is a schematic block diagram illustrating a structure of a spectral characteristics estimation device, according to an example embodiment of the present invention.

FIG. 1 is a schematic block diagram illustrating a structure of a spectral characteristics estimation device, according to an example embodiment of the present invention. In this example, the spectral characteristics estimation device of FIG. 1 may be implemented by the spectrometer 101 having a sensor, and a processor circuit that performs calculation based on sensor responses detected by the spectrometer 101. More specifically, the spectral characteristics estimation device of FIG. 1 includes a spectrometer 101, a sensor response extender 102, a spectral reflectance estimator 103, a transformation matrix memory 104, a sample spectral reflectance memory 105, and a transformation matrix calculator 106. In FIG. 1, the solid-line arrows indicate a flow of data when the spectral characteristics estimation device estimates spectral characteristics of a target object based on sensor responses from the spectrometer 101. The dotted-line arrows indicate a flow of data when the spectral characteristics estimation device calculates a transformation matrix, which is a conversion parameter used for spectral characteristics calculation.

Now, estimating spectral reflectance, performed by the spectral characteristics estimation device of FIG. 1, is explained according to an example embodiment of the present invention.

The spectrometer 101 divides a light flux incident from the target object into the total of m wavelength bands to obtain a light intensity signal for each wavelength band. Using a light intensity sensor that corresponds to each one of the wavelength bands, the light intensity signal for each wavelength band is detected. The detection result, which is the light intensity signal, is output as a sensor response. In this example, the spectrometer 101 has a structure shown in FIG. 3.

Figure 3:
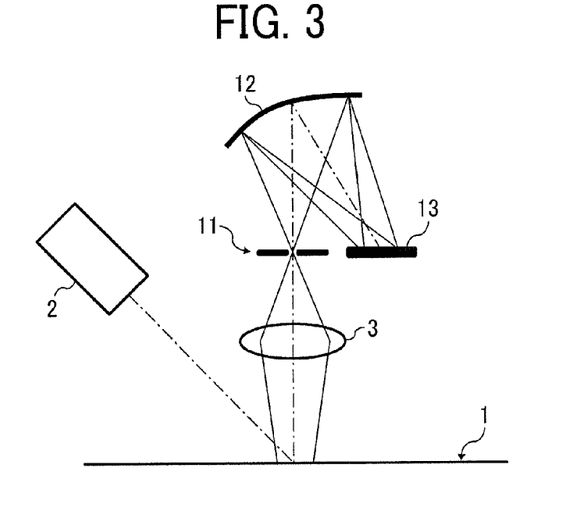
FIG. 3 is a schematic diagram illustrating a structure of the spectrometer of the spectral characteristics estimation device of FIG. 1.

Referring to FIG. 3, it is assumed that an illumination system 2, such as a light source, irradiates light toward the target object 1, from the direction that is tilted by 45 degrees with respect to the normal direction of the surface ("measured surface") of the target object 1. The spectrometer 101 is further provided with a collective lens 3. The collective lens 3 collects a flux of diffused reflective lights reflected from the measured surface such that the collected light flux enters through a slit 11. The light flux that enters the slit 11 is dispersed and collected at a convex surface of a diffraction element 12. The light is then guided to an array light receiving element 13. The array light receiving element 13 includes a plurality of light receiving areas that are arranged in the direction that corresponds to the direction of diffraction of the convex surface of the diffraction element 12. The light receiving areas of the array light receiving element 13 respectively detect the light intensity signals having different wavelength ranges.

Based on the detection results detected by the light receiving areas of the array light receiving element 13 and a light intensity signal obtained such as from a reference white surface, the spectrometer 101 may calculate the reflectance for each wavelength band that corresponds to each light receiving area to generate the spectral reflectance.

In this example, however, the spectrometer 101 outputs the detection results detected by the light receiving areas of the array light receiving element 13 as the sensor responses. More specifically, based on the sensor responses output from the spectrometer 101, a row vector is generated, whose elements are the light intensity signals of m wavelength bands. This row vector is referred to as a sensor response vector v. The sensor responses, i.e., the sensor response vector v, output from the spectrometer 101 is input to a sensor response extender 102. The sensor response extender 102 may be implemented by a circuit that performs the function of generating an extended sensor response as described below.

The sensor response extender 102 extracts at least two light intensity signals whose wavelength ranges are at least partially overlapped with each other, from the sensor responses received from the spectrometer 101. The sensor response extender 102 further calculates a product of these two light intensity signals (second order term) whose wavelength ranges are at least partially overlapped with each other to generate a calculation result. The sensor response extender 102 combines the calculation result with the sensor response to generate the extended sensor response. In this example, the sensor response extender 102 does not calculate a product of light intensity signals if the wavelength ranges are not overlapped between the light intensity signals. The sensor response extender 102 generates a row vector whose elements include the light intensity signals obtained for the m wavelength bands (that is, the sensor responses), and the calculated product. This row vector is referred to as the extended sensor response vector v".

The extended sensor response generated by the sensor response extender 102 is input to the spectral reflectance estimator 103. The spectral reflectance estimator 103 may be implemented by a circuit that performs the function of estimating spectral characteristics of the target object.

The spectral reflectance estimator 103 obtains a transformation matrix G" that is stored in the transformation matrix memory 104. The transformation matrix memory 104, which performs the function of storing the transformation parameter, may be implemented by any desired memory such as NVRAM. The spectral reflectance estimator 103 calculates a product of the extended sensor response vector v" generated by the sensor response extender 102 based on the extended sensor response, and the transformation matrix G" to generate a calculation result. The calculation result is output as a spectral reflectance vector r, which indicates the spectral reflectance of the target object. In this example, this spectral reflectance vector r is treated as the spectral characteristics of the target object.

As described above, in this example, a product of first order terms, i.e., second order term, which are the elements of the extended sensor response vector v" is obtained while taking account whether the wavelength ranges are overlapped between two light intensity signals. More specifically, when the wavelength ranges are not overlapped between the two light intensity signals that are used for second order term calculation, these two light intensity signals are optically independent from each other such that there is no interaction. When the wavelength ranges are overlapped at least partially between the two light intensity signals, the resultant product of these two light intensity signals are interacted with each other such that this interaction would be significant. In this example, the extended sensor response vector v" is generated so as to only include the second order terms having such significant interactions. This improves the accuracy in measuring, or accuracy in estimating, the spectral reflectance indicated by the spectral reflectance vector r.

Next, calculating transformation matrix G to be stored in the transformation matrix memory 104 is explained according to an example embodiment of the present invention.

Assuming that the sensor responses are obtained for the total of m light intensity signals respectively having different wavelength bands, the sensor responses are expressed by the sensor response vector v, which is a row vector having m elements that correspond to m light intensity signals. The spectral reflectance vector r can be estimated from the sensor response vector v, using the transformation matrix G, as indicated by the equation: r=Gv.

From the above-described equation, the transformation matrix G is defined as a regression coefficient matrix having the sensor response vector v as explanatory variable, and the spectral reflectance vector as objective variable. By applying Moor-Penrose Generalized Inverse, the transformation matrix G is defined as $G=RV^{t}(VV^{t})^{-1}$. The term "t" indicates the transpose of vector or matrix, and the term "−1" indicates the inverse matrix. The inverse matrix may be solved using the singular value decomposition method.

Figure 5:
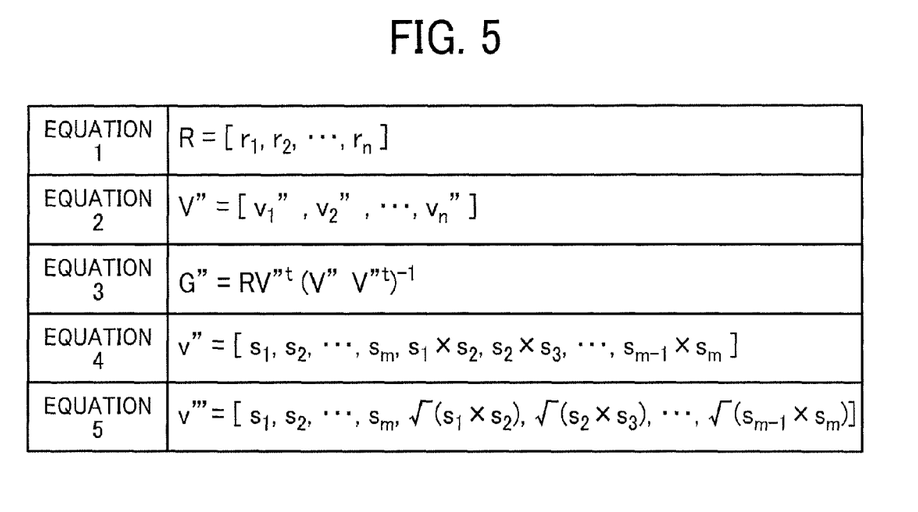
FIG. 5 is a table of equations processed by the spectral characteristics estimation device of FIG. 1 in estimation of spectral characteristics.

In this example, the total of "n" color samples are previously prepared each having the known spectral reflectance r. The spectral reflectance vectors $r_1$ to $r_n$ are expressed as a sample spectral reflectance matrix R as indicated by the equation 1 of FIG. 5. This sample spectral reflectance matrix R is stored in a sample spectral reflectance memory 105. The sample spectral reflectance memory 105 may be implemented by any desired memory such as NVRAM. Further, using the spectrometer 101, the sensor responses are obtained for the n color samples as the sample sensor responses.

The sample sensor responses of the n color samples are input to the sensor response extender 102. The sensor response extender 102 generates sample extended sensor response vectors $v_1"$ to $v_n"$ that respectively correspond to the sample sensor responses. These sample extended sensor response vectors $v_1"$ to $v_s"$ are expressed as a sample extended sensor response matrix V" as indicated by the equation 2.

The sample extended sensor response matrix V" of the sample extended sensor response vectors $v_1"$ to $v_n"$ is input to the transformation matrix calculator 106. The transformation matrix calculator 106 may be implemented by a circuit that performs the function of calculating a transformation parameter, such as the transformation matrix G". The transformation matrix calculator 106 calculates the transformation matrix G", using the sample extended sensor response matrix V" obtained by the sensor response extender 102, and the sample spectral reflectance matrix R that is stored in the sample spectral reflectance memory 105, as indicated by the equation 3. The calculated transformation matrix G" is stored in the transformation matrix memory 104.

Figure 2:
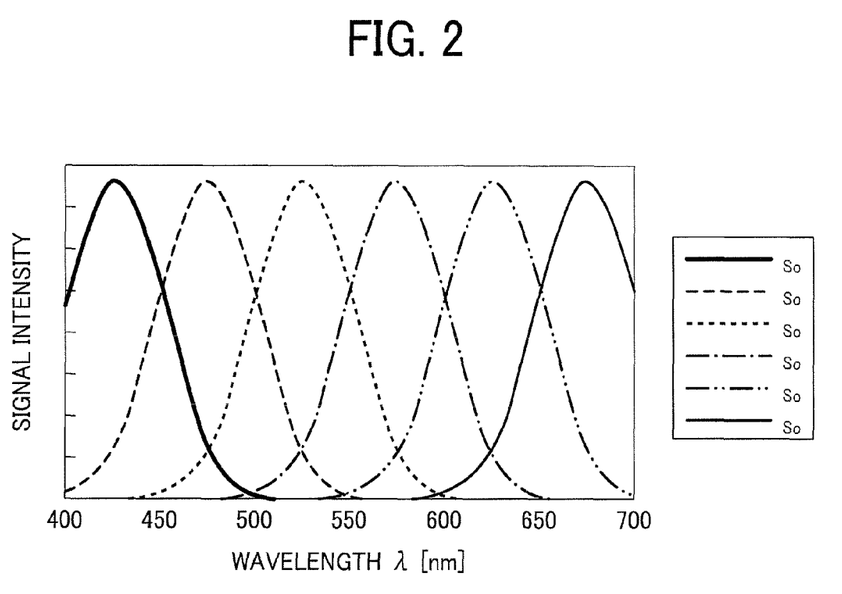
FIG. 2 is a graph illustrating the light intensity signals detected by a spectrometer of the spectral characteristics estimation device of FIG. 1.

FIG. 2 is a graph illustrating six light intensity signals detected by the spectrometer 101 of FIG. 3.

At the spectrometer 101, the array light receiving element 13 detects the light intensity signal for each wavelength band after the diffraction element 12 disperses the light flux. Since a width of the slit 11 is limited, an image formed on the array light receiving element 13 when an arbitrary single color light enters has a limited width depending on the width of the slit 11 and imaging capability of the optical system. When the center of gravity of the image is positioned at boundaries between two light receiving areas of the array light receiving element 13, the light intensity signal is detected for each of the light receiving areas. More specifically, as illustrated in FIG. 2, for at least the light intensity signals that are respectively detected at two light receiving areas that are adjacent with each other, the wavelength ranges are partially overlapped with each other between these light intensity signals.

In the example illustrated in FIG. 2, for a combination of the light intensity signals, which are detected by the light receiving areas that are adjacent with each other, the light intensity level detected in the wavelength ranges that are overlapped with each other between the light intensity signals is significantly large. The degree of overlap, such as the size of overlapped portion, between the light intensity signals may be adjusted by changing the width of the slit 11. For a combination of the light intensity signals other than the light intensity signals that are partially overlapped, since the wavelength ranges are not largely overlapped or not overlapped between the light intensity signals, the signal components of the light intensity signals can be hardly distinguished from the noise that may be introduced at the time of measurement. Accordingly, the extended sensor response vector v" is generated so as to include the product of the light intensity signals whose wavelength ranges are sufficiently overlapped with each other, thus improving the accuracy in measurement or estimation. More specifically, in the example illustrated in FIG. 2, a product of the two light intensity signals that are detected from the light receiving areas that are adjacent with each other is included in the extended sensor response vector v", as indicated by equation 4 of FIG. 5. The light intensity signals that are sufficiently overlapped with each other correspond to the wavelength ranges whose central wavelengths are adjacent with each other.

For example, assuming that the array light receiving element 13 has 6 light receiving areas, that is, m is equal to 6, the sensor response extender 102 causes the extended sensor response vector v" to include only five terms out of 36 second order terms that would be included in the extended sensor response vector v' proposed by Tsumura, et al. Accordingly, the extended sensor response vector v" of this example has 11 elements, which is much less than a number of elements, i.e., 42, of the extended sensor response vector v' proposed by Tsumura, et al.

In alternative to the above-described example, the extended sensor response vector v" may be obtained differently. For example, instead of obtaining a product of the two light intensity signals having the wavelength ranges that are significantly overlapped with each other, the square root of the product of the two light intensity signals having the wavelength ranges that are significantly overlapped with each other may be obtained. The extended sensor response vector v'" is thus expressed as equation 5 of FIG. 5.

In case the product of the two light intensity signals is used as the elements of the extended sensor response, the product corresponds to a signal related to the signal components having the wavelength ranges that are overlapped with each other. The signal related to the signal components having the overlapped wavelength ranges is almost proportional to the squared value of the light intensity signals. The spectral reflectance vectors $r_1$ to $r_n$ of the sample spectral reflectance matrix R, and the sample sensor response vector $v_1$ to $v_n$ of the sample sensor response matrix v, are each proportional to the light intensity. That is, the objective variable and the explanatory variable respectively used for calculating the transformation matrix G are each proportional to the light intensity. Accordingly, it is desirable to have the signal used as the extended elements, which is substantially proportional to light intensity. In this example, since the square root of the product of the two light intensity signals is used as the extended elements, the signal used as the extended elements has a central wavelength at the portion where the wavelength ranges are overlapped between the two light intensity signals. The signal used as the extended elements would behave similarly as the signal that is substantially proportional to the light intensity. This further improves the accuracy in measurement or estimation of the spectral reflectance vector r.

Once the spectral reflectance of the target object, other spectral characteristics including, for example, spectral reflectivity, spectral transmittance, and various parameters (color measurement values) in XYZ or L*a*b* color system may be obtained based on the spectral reflectance. In this example, the color system may be any color system specified by, for example, the International Communication on Illumination (CIE).

Further, in the above-described example, the sample spectral reflectance matrix R is used as the objective variable of the transformation matrix G. Alternatively, tristimulus value of XYZ color system specified by CIE may be used. In such case, using the tristimulus values of color samples that are previously measured by the spectrometers, a matrix that functions as the sample spectral reflectance matrix R is generated. If the tristimulus values are used, the tristimulus values can be measured or estimated with improved accuracy based on the sensor responses of the spectrometer 101.

Further, any other spectral characteristics such as spectral transmittance may be measured or estimated in a substantially similar manner as described above, using a plurality of samples from which the objective variable can be obtained.

In the above-described examples, the spectrometer 101 having the diffraction element 12 and the array light receiving element 13 is used, but any desired spectrometer may be used. For example, the spectrometer may have a structure such that it outputs the signals having the same optical characteristics as a broad-bandpass filter that respectively output signals having different central wavelengths. As long as the two signals having the central wavelengths that are adjacent with each other have wavelength ranges that are at least partially overlapped with each other, the spectral characteristics may be obtained as described above. In one example, the spectrometer may detect lights by using a plurality of bandpass color filters, specifically, by replacing one from another as illustrated in FIG. 1 of Tsumura, et al. In another example, a plurality of light sources such as LED each having a different central wavelength may be sequentially turned on such that one source is lighted at one time for measurement by the spectrometer. The RGB color sensor provided with a color filter may be applicable as long as the output signals are partially overlapped with each other.

Further, the two light intensity signals having wavelength ranges that are partially overlapped with each other are not limited to the two light intensity signals having the central wavelengths that are adjacent with each other. For example, the light intensity signal detected by the spectrometer may have two or more wavelength ranges, which are independent from each other. That is, the light intensity signals obtained from the dispersed lights may each have the peaks at two or more wavelength ranges. In such case, if the wavelength ranges respectively having the peaked wavelengths are partially overlapped with each other between the two light intensity signals, these light intensity signals may be included as the extended elements.

Figure 4:
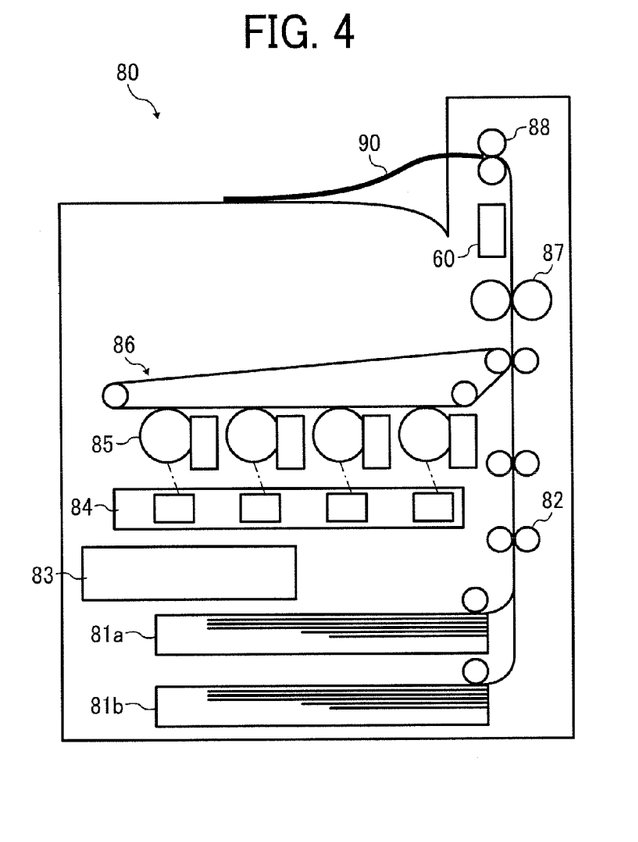
FIG. 4 is a cross-sectional view illustrating a structure of an image forming apparatus provided with the spectral characteristics estimation device of FIG. 1.

The spectral characteristics estimation device of FIG. 1 may be incorporated into any apparatus such as an image forming apparatus. For example, the spectral characteristics estimation device of FIG. 1 may be input with the output image output from the image forming apparatus. Based on the spectral characteristics output from spectral characteristics estimation device of FIG. 1, the image forming conditions of the image forming apparatus may be corrected. Referring now to FIG. 4, application of the spectral characteristics estimation device of FIG. 1 is explained.

Referring to FIG. 4, an image forming apparatus 80 is provided with the spectral characteristics estimation device of FIG. 1. The image forming apparatus 80 further includes a sheet feed cassette 81a, a sheet feed cassette 81b, a sheet feed roller pair 82, a controller unit 83, an optical writing system 84, a plurality of photoconductors 85, an intermediate transfer body 86, a fixing roller pair 87, and a discharge roller pair 88. The reference 90 denotes an image carrier such as paper.

As the optical writing system 84 exposes light onto the surfaces of the photoconductors 85, latent images of respective colors are formed on the surfaces of the photoconductors 85. The latent images are applied with toner of respective colors to be developed into toner images. The toner images of respective colors that are formed on the surfaces of the photoconductors 85 are superimposed one above the other onto the intermediate transfer body 86 to form a full-color composite image thereon. The full-color image formed on the intermediate transfer body 86 is transferred onto the image carrier 90, which is conveyed by a guide and the sheet feed roller pair 82 from the sheet feed cassette 81a or 81b. The full-color image transferred onto the image carrier 90 is fixed by the fixing roller pair 87, as the image carrier 90 is transferred through a nip formed by the fixing roller pair 87. The image carrier 90 having the fixed toner image thereon is discharged by the discharge roller pair 88 onto the top surface of the image forming apparatus 80. In this example, the spectral characteristics estimation device of FIG. 1 is provided at a section 60 between the fixing roller pair 87 and the discharge roller pair 88.

In this image forming apparatus, the spectral characteristics estimation device of FIG. 1 measures or estimates the spectral characteristics of the image formed on the image carrier 90, and outputs a detection result to the controller unit 83. The controller unit 83, which is implemented by a processor, corrects or adjusts various image forming conditions such as image forming parameters based on the detection result. For example, the controller unit 83 automatically calibrates colors based on the spectral reflectance obtained by the spectral characteristics estimation device. With this calibration, the image forming apparatus 80 continuously outputs the high-quality image while suppressing color fluctuations.

As described above, the spectrometer 101 uses the array receiving element 13, which functions as a light intensity sensor, to detect the light intensity signal for each one of the wavelength bands, and outputs the light intensity signals $s_1$ to $s_m$ as sensor responses. Based on the sensor responses, which are expressed by the sensor response vector v, the spectral reflectance, which is one example of spectral characteristics, is obtained for the target object.

Figure 6:
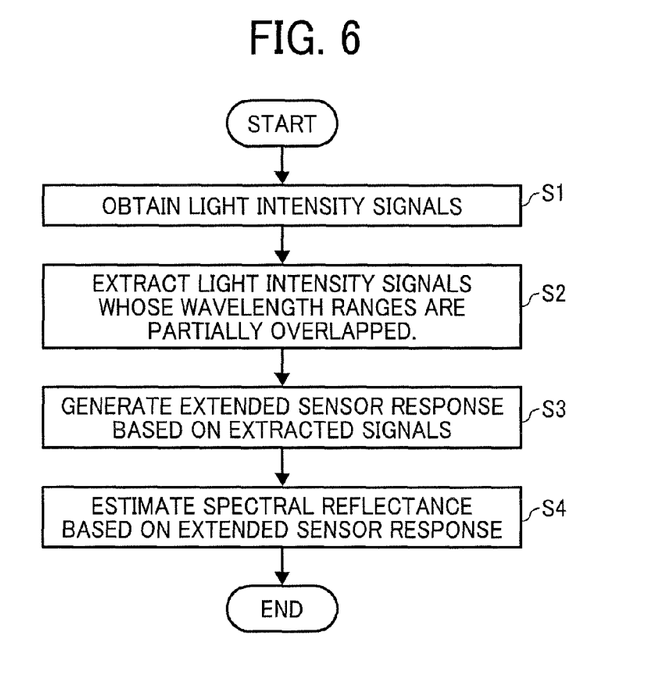
FIG. 6 is a flowchart illustrating operation of estimating spectral characteristics, performed by the spectral characteristics estimation device of FIG. 1, according to an example embodiment of the present invention.

Referring now to FIG. 6, operation of estimating spectral reflectance, performed by the spectral characteristics estimation device of FIG. 1, is explained according to an example embodiment of the present invention. For example, the processor circuit of the spectral characteristics estimation device of FIG. 1 is provided with a memory that stores a spectral characteristics estimation control program. Upon execution, the spectral characteristics estimation control program is loaded to cause the processor circuit to perform operation of FIG. 6.

At S1, the sensor response extender 102 obtains the light intensity signals detected by the spectrometer 101 from the target object. The array light receiving element 13 of the spectrometer 101 detects the light intensity signals $s_1$ to $s_m$, respectively, for the m wavelength bands. In this example, the array light receiving element 13 detects at least two light intensity signals having wavelength ranges that are partially overlapped with each other. The light intensity signals $s_1$ to $s_m$ is output to the sensor response extender 102.

At S2, the sensor response extender 102 obtains the light intensity signals $s_1$ to $s_m$, which may be defined as the sensor response vector v, from the spectrometer 101, and selects at least two light intensity signals whose wavelength ranges are partially overlapped with each other.

At S3, the sensor response extender 102 calculates a product $(s_1 * s_2, s_2 * s_3 \square \ldots, s_{m-1} * s_m)$ of the two light intensity signals having the wavelength ranges that are partially overlapped with each other, selected at S2, to generate a calculation result. The sensor response extender 102 further combines the calculation result with the sensor response vector v to generate the extended sensor response vector v" in which the product of the two light intensity signals whose wavelength ranges are not overlapped is excluded.

At S4, the spectral reflectance estimator 103 estimates the spectral reflectance, that is, the spectral reflectance vector r, of the target object, based on the extended sensor response vector v". More specifically, in this example, the spectral reflectance estimator 103 calculates the spectral reflectance using the transformation matrix G" stored in the transformation matrix memory 104.

The above-described operation of FIG. 6 may be performed in various other ways. For example, at S3, the sensor response extender 102 may calculate a square root of the product of the two light intensity signals having the wavelength ranges that are partially overlapped with each other to generate a calculation result, and combines the calculation result with the sensor response to generate an extended sensor response.

In another example, at S2, the sensor response extender 102 may select at least two light intensity signals whose wavelength ranges are significantly overlapped with each other, such as the at least two light intensity signals whose central wavelengths are adjacent with each other.

Further, any one of the above-described steps of FIG. 6 may be combined so as to be performed together. For instance, S2 and S3 may be interpreted as the same step.

As described above, the inventors of the present invention have discovered that the product of the two light intensity signals whose wavelength ranges are not partially overlapped with each other correspond to insignificant signal components that do not contribute much to explain interaction of the light intensity signals. Including this product of the two light intensity signals whose wavelength ranges are not partially overlapped would not so much improve the estimation accuracy. Further, the use of this product of the two light intensity signals whose wavelength ranges are not partially overlapped may lower the estimation accuracy due to noise introduced at the time of signal detection. Based on this finding, in generating the extended sensor response, the product of the two light intensity signals that are partially overlapped with each other is included as the elements, while excluding the two light intensity signals whose wavelength ranges are not overlapped with each other.

In this manner, since a number of high order terms, i.e., a number of elements, to be included in the extended sensor response vector is reduced, the processing time required for spectral reflectance estimation is greatly reduced. Further, since the high order terms to be included in the extended sensor response vector are the terms that significantly contribute to the spectral reflectance estimation, the estimation accuracy is improved.

As described above, in this example, operation of calculating a transformation matrix is performed as follows.

The spectrometer 101 diffuses a light flux incident from a plurality of samples whose spectral reflectance $r_1$ to $r_n$ are known, according to a predetermined number of wavelength bands, to cause the array receiving light element 13 to detect the light intensity signal for each of the wavelength bands.

The sensor response extender 102 uses the light intensity signals of the samples, which are detected by the spectrometer 101, to generate extended sensor responses for the samples, which are defined as a sample extended sensor response matrix v". Using the sample extended sensor response matrix v", and the spectral reflectance $r_1$ to $r_n$ of the samples that is defined as the sample spectral reflectance matrix R, a transformation matrix G" is calculated. The transformation matrix G" is a conversion parameter that converts the extended sensor response vector v" to the spectral reflectance r.

The above-described operation of calculating the transformation matrix G" may be performed, for example, at a predetermined time to calibrate the spectrometer 101. For example, the transformation matrix G" that is previously stored in the transformation matrix memory 104 may be updated with the newly calculated transformation matrix G".

As described above, in estimating the spectral characteristics of the target object based on the sensor response of the spectrometer, the optical interaction, which is selected based on the optical characteristics of the spectrometer, is used to generate the extended sensor response. More specifically, as described above, a product of the light intensity signals whose wavelength ranges are partially overlapped with each other is selected and used to generate the extended sensor response.

For example, in generating the extended sensor response, the sensor response extender 102 calculates the product of the two light intensity signals having the central wavelengths that are adjacent with each other to generate a calculation result, and combines the calculation result with the sensor response vector v to generate an extended sensor response vector v" from which the product of two light intensity signals whose central wavelengths are not adjacent with each other is excluded. This improves the estimation accuracy, especially, when the optical characteristics of the sensor response functions as a bandpass filter having different central wavelengths. For example, when the spectrometer diffuses the light using prism or diffraction element, and generates a sensor response using the array light receiving element, the output sensor response behaves as the bandpass filter.

Alternatively, the sensor response extender 102 may calculate a square root of the product of the two light intensity signals whose wavelength ranges are partially overlapped with each other to generate the extended sensor response vector v'". This improves the accuracy in estimating the spectral reflectance. For example, when the spectrometer outputs the sensor response using the light receiving element that outputs a signal that is substantially proportional to the light intensity signal, the use of square root of the product of the two light intensity signals would further improve the estimation accuracy.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In one example, the present invention may reside in a spectral characteristics estimation or measurement method, which diffuses a light flux incident from a target object according to a predetermined number of wavelength bands, detects a light intensity signal for each of the wavelength bands using a light intensity sensor to output the detected light intensity signal as a sensor response, and estimates or measures spectral characteristics of the target object based on the sensor response. The method further includes detecting the light intensity signals of the predetermined number of wavelength bands using the light intensity sensor to generate a sensor response, the detected light intensity signals including at least two light intensity signals whose wavelength ranges are partially overlapped with each other; calculating a product of the two light intensity signals whose wavelength ranges are partially overlapped with each other based on the detected light intensity signals to generate a calculation result, and combining the calculation result with the sensor response to generate an extended sensor response from which a product of two light intensity signals whose wavelength ranges are not superimposed with each other is excluded; and calculating the spectral characteristics of the target object based on the extended sensor response.

In the above-described example, the method further includes: diffusing a light flux incident from each one of a plurality of samples each having known spectral characteristics according to the predetermined number of wavelength bands, and detecting a light intensity signal of each of the wavelength bands using the light intensity sensor; and generating an extended sensor response for each of the plurality of samples using the detected light intensity signal, and calculating a transformation parameter used for converting the extended sensor response to the spectral characteristics of the object based on the extended sensor responses and the known spectral characteristics. The spectral characteristics of the object is estimated from the extended sensor response using the transformation parameter that is calculated.

In the above-described example, in the step of generating the extended sensor response, a product of at least two light intensity signals whose central wavelengths are adjacent with each other is calculated to generate a calculation result. The calculation result is combined with the sensor response to generate the extended sensor response from which a product of at least two light intensity signals whose central wavelengths are not adjacent with each other is excluded.

In the above-described example, in the step of generating the extended sensor response, a square root of the product of at least two light intensity signals whose wavelength ranges are partially overlapped with each other is calculated to generate a calculation result. The calculation result is combined with the sensor response to generate the extended sensor response.

In another example, the present invention may reside in a spectral characteristics estimation or measurement device that performs any one of the above-described methods.

In another example, the present invention may reside in an image forming apparatus that forms an image of a plurality of colors on an image carrier, including: means for measuring or estimating spectral characteristics of the image formed on the image carrier; means for correcting image forming conditions based on the spectral characteristics. The means for measuring or estimating spectral characteristics is implemented by any one of the spectral characteristics estimation devices described above.

What is claimed is:

1. A method of estimating spectral characteristics of an object, the method comprising:
   measuring a sensor response indicating light intensity signals of a predetermined number of wavelength bands that are respectively detected by a light intensity sensor from the object;
   extracting, from the measured light intensity signals of the sensor response, at least two light intensity signals whose wavelength ranges are partially overlapped with each other;
   generating an extended sensor response based on a product of the extracted light intensity signals and the sensor response; and
   estimating the spectral characteristics of the object based on the extended sensor response,
   wherein the generating an extended sensor response includes calculating a square root of the product of the extracted light intensity signals to generate a calculation result, and combining the calculation result with the sensor response to generate the extended sensor response.

2. The method of claim 1, wherein:
   the extracted light intensity signals are at least two light intensity signals whose central wavelengths are adjacent with each other.

3. The method of claim 1, further comprising:
   storing a transformation parameter that converts an extended sensor response to spectral characteristics in a memory, wherein
   the estimating the spectral characteristics estimates the spectral characteristics of the object using the transformation parameter.

4. The method of claim 3, further comprising:
   storing spectral characteristics of a sample in a memory;
   obtaining a sample sensor response indicating light intensity signals of the predetermined number of wavelength bands that are respectively detected by the light intensity sensor from the sample;
   generating a sample extended sensor response, based on a product of at least two light intensity signals of the sample sensor response whose wavelength ranges are partially overlapped with each other and the sample sensor response;
   calculating a transformation parameter that converts the sample extended sensor response to the spectral characteristics of the sample, based on the sample extended sensor response and the spectral characteristics of the sample; and updating the transformation parameter that is previously stored in the memory with the calculated transformation parameter.

5. A device for estimating spectral characteristics of an object, the device comprising:
   a sensor response extender circuit to:
      obtain a sensor response indicating light intensity signals of a predetermined number of wavelength bands that are respectively detected by a light intensity sensor from the object;
      extract, from the detected light intensity signals of the sensor response, at least two light intensity signals whose wavelength ranges are partially overlapped with each other; and
      generate an extended sensor response based on a product of the extracted light intensity signals and the sensor response; and
   a spectral characteristics estimator circuit to estimate the spectral characteristics of the object based on the extended sensor response,
   wherein the sensor response extender circuit includes a circuit to calculate a square root of the product of the extracted light intensity signals to generate a calculation result, and a circuit to combine the calculation result with the sensor response to generate the extended sensor response.

6. The device of claim 5, wherein
   the extracted light intensity signals are at least two light intensity signals whose central wavelengths are adjacent with each other.

7. The device of claim 5, further comprising:
   a memory to store a transformation parameter that converts an extended sensor response to spectral characteristics, wherein
   the spectral characteristics estimator circuit estimates the spectral characteristics of the object using the transformation parameter.

8. The device of claim 7, further comprising: a memory to store spectral characteristics of a sample; and
   a transformation parameter calculator circuit to calculate the transformation matrix, wherein
   the sensor response extender circuit obtains a sample sensor response indicating light intensity signals of the predetermined number of wavelength bands that are respectively detected by the light intensity sensor from the sample, and generates a sample extended sensor response based on a product of at least two light intensity signals of the sample sensor response whose wavelength ranges are partially overlapped with each other and the sample sensor response, and
   the transformation parameter calculator circuit calculates a transformation parameter that converts the sample extended sensor response to the spectral characteristics of the sample, based on the sample extended sensor response and the spectral characteristics of the sample, and updates the transformation parameter that is previously stored in the memory with the calculated transformation parameter.

9. The device of claim 8, further comprising:
   a spectrometer having an element to diffuse a light flux incident from the object and the light intensity sensor to detect the light intensity signals of the predetermined number of wavelength bands.

10. An image forming apparatus, comprising:
    an image forming device to form an image on an image carrier; and the device of claim 9, wherein the object is the image formed by the image forming device.

11. The image forming apparatus of claim 10, further comprising:
    a controller circuit to control parameters of the image forming device based on the spectral characteristics of the object.

12. A non-transitory recording medium storing a plurality of instructions which cause a processor to perform a method of estimating spectral characteristics of an object, the method comprising:
    measuring a sensor response indicating light intensity signals of a predetermined number of wavelength bands that are respectively detected by a light intensity sensor from the object;
    extracting, from the detected light intensity signals of the sensor response, at least two light intensity signals whose wavelength ranges are partially overlapped with each other;
    generating an extended sensor response based on a product of the extracted light intensity signals and the sensor response; and
    estimating the spectral characteristics of the object based on the extended sensor response,
    wherein the generating an extended sensor response includes calculating a square root of the product of the extracted light intensity signals to generate a calculation results, and combining the calculation result with the sensor response to generate the extended sensor response.

* * * * *